(12) United States Patent
Fisher et al.

(10) Patent No.: US 6,249,398 B1
(45) Date of Patent: Jun. 19, 2001

(54) CLASS OF FIXED PARTIAL RESPONSE TARGETS IN A PRML SAMPLED DATA DETECTION CHANNEL

(75) Inventors: Kevin Fisher, Palo Alto; Kelly K. Fitzpatrick, Los Altos; Cory Modlin, Palo Alto, all of CA (US); Ara Patapoutian, Westborough, MA (US); Jeffrey L. Sonntag; Necip Sayiner, both of Allentown, PA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/034,933

(22) Filed: Mar. 4, 1998

(51) Int. Cl.⁷ .................................................. G11B 5/035
(52) U.S. Cl. .............................. 360/65; 360/46; 375/290; 375/341; 375/350
(58) Field of Search ........................ 360/65, 46; 375/262, 375/263, 290, 340–341, 350; 714/794, 795

(56) References Cited

U.S. PATENT DOCUMENTS

| | | | |
|---|---|---|---|
| 4,847,871 | 7/1989 | Matsushita et al. | 375/94 |
| 5,042,036 | 8/1991 | Fettweis | 371/43 |
| 5,291,499 | 3/1994 | Behrens et al. | 371/43 |
| 5,341,249 | 8/1994 | Abbott et al. | 364/46 |
| 5,341,387 | 8/1994 | Nguyen | 371/45 |
| 5,381,359 | 1/1995 | Abbott et al. | 364/724.19 |
| 5,384,671 | 1/1995 | Fisher | 360/51 |
| 5,424,881 | 6/1995 | Behrens et al. | 360/40 |
| 5,886,842 * | 3/1999 | Ziperovich | 360/51 |
| 6,032,284 * | 2/2000 | Bliss | 714/792 |

OTHER PUBLICATIONS

Maximum–Likelihood Sequence Estimation of Digital Sequences in the Presence of Intersymbol Interference, G. David Forney, Jr., IEEE Transactions on Information Theory, vol. IT–18, No. 3, May 1972, pp. 363–378.

A Class of Partial Response Systems for Increasing Storage Density in Magnetic Recording, H.K. Tharpar et al., IEEE Transactions on Magnetics, vol. MAG–23, No. 5, Sep. 1987, pp. 3666–3668.*

Viterbi Detection of Class IV Partial Response on a Magnetic Recording Channel, Wood et al., IEEE Transactions on Communications, vol. COM–14, No. 5, May 1986, pp. 454–461.*

Channel Coding wtih Multilevel/Phase Signals, Gottfried Ungerboeck, IEEE Transactions on Information Theory, vol. IT–28, No. 1, Jan. 1982, pp. 55–67.*

Evaluating Performance of Maximum Likelihood Sequence Detection in a Magnetic Recording Cannel, Cioffi et al., IEEE Global Telecommunications Conference, conference record, 1986, pp. 1066–1070.*

PRML Detection Boosts Hard–Disk Drive Capacity, Kevin D. Fisher et al., The Practical Engineer, IEEE Spectrum, Nov. 1996, pp. 70–78.*

Alan V. Oppenheim and Ronald W. Schafer, "Digital Signal Processing," Chap. 7.2, pp. 345–353, Prentice–Hall, Inc., 1975.

* cited by examiner

Primary Examiner—David Hudspeth
Assistant Examiner—Dan I. Davidson
(74) Attorney, Agent, or Firm—Fish & Richardson

(57) ABSTRACT

A new class of fixed partial response targets are disclosed for use in a PRML magnetic medium read channel. The preferred embodiment exhibits an equalization response characterized by the polynomial $7+4*D-4*D^2-5*D^3-2*D^4$, where D represents the unit delay operator. This read channel target provides improved matching to the inherent magnetic channel over the known canonical class of targets $(1-D)(1+D)^N$, and thereby reduces equalization losses. The improved spectral matching reduces amplification of noise in the channel, thereby reducing bit-error-rates. The new class of targets also exhibits a spectral null at DC, reducing problems for offset cancellation circuitry and making the disk drive less sensitive to thermal asperities. It also exhibits a spectral depression rather than a spectral null at the Nyquist frequency, making quasi-catastrophic error sequences virtually impossible. The new class of target simplifies coding and allows RLL code ratios that approach unity, improving effective recording densities, while significantly reducing BER.

28 Claims, 3 Drawing Sheets

CLASS OF FIXED PARTIAL RESPONSE TARGETS IN A PRML SAMPLED DATA DETECTION CHANNEL

RELATED APPLICATION

This application is related to U.S. patent application Ser. No. 08/774,412 filed Dec. 31, 1996 entitled A RATE 24/25 MODULATION CODE FOR PRML RECORDING CHANNEL now U.S. Pat. No. 5,757,294.

BACKGROUND OF THE INVENTION

1. Field of the Invention

The present invention is in the field of digital data storage technology and, more specifically, pertains to improvements in partial response, maximum likelihood detection systems of the type commonly used in read channels of magnetic recording systems, particularly disk drives and tape systems.

2. Description of the Related Art

Performance of magnetic storage devices has improved dramatically over the past decade. Strides have been made in reduced error rates, lower cost, faster operating speeds, and increased storage capacity on magnetic tape and disk systems. There are various ways to increase storage capacity on disk drives, for example. One way is to increase the number of concentric tracks on the disk. Also, data can also be encoded more efficiently before writing to disk, thereby increasing the ratio of stored data to error correcting data— or more generally, reducing encoding overhead. Another important way to increase capacity has been to increase the bit density on the magnetic platters of the device, that is, pack the data more tightly on a given track. When this method is implemented, writing data is still relatively simple using standard inductive head technology. Reading the data back, however, becomes more challenging as spacing between flux transitions on the medium is reduced.

To ensure accurate data reads, several methods are used. First, it is known to use two separate heads; one for reading and one for writing. Standard inductive heads are used for writing, and ultra-sensitive magneto-resistive (MR) heads are used for reading. The read heads generate analog signals in response to flux transitions on the medium, and how this "read signal" is interpreted or "detected" by the drive electronics is the focus of the present invention.

In the past, a method of detection known as "pulse-peak" detection was used. Pulse-peak detection works in the following (highly simplified) manner. The signal from the read head is rectified, then threshold qualified to determine a window around the signal pulse peaks. Next, it is differentiated, which causes the flux transitions from the original input signal to appear as zero-crossings. Apply this final signal to a zero-crossing detector, and the circuit generates a pulse each time there is an input signal peak. This method worked well enough, as long as there were spaces between transitions on the medium, but as drive capacities have increased its limitations have surfaced. Inter symbol interference (ISI) caused by adjacent transitions on the medium can shift the timing of detected pulse peaks, and generate read errors.

To avoid ISI, transitions must be physically separated on the disk. This spacing wastes precious disk space, however. For example, with standard pulse-peak run-length-limited coding of (1,7), the ratio of user data to stored data on the drive is only 2:3. On a drive with a 6 GB capacity (around the current hard drive average), this wastes a full 2 GB of drive space—an unacceptable amount. Also, differentiating the incoming signal amplifies high frequency noise, which degrades the signal-to-noise ratio of the read channel and again increases the number of errors. As bit densities increase, the bit-error rate of pulse-peak detection increases, as does the amount of wasted space.

It is also known that partial response signaling better tolerates ISI and allows more efficient use of the bandwidth of a given channel. Specifically, partial response channels allow transitions in adjacent bit cells, and thus accommodate higher code rates than peak detection. Since the nature of ISI is well known, it can be taken into account in the decoding/ detection process. Partial response transmission of data lends itself to synchronous sampling and provides a good compromise between error probability and the available spectrum.

Briefly, partial response, maximum likelihood ("PRML") read channels work by sampling a pulse—e.g. the read signal pulse resulting from a magnetic flux reversal—several times instead of just detecting a peak. The pulse is wider than just one bit-time, i.e. more than one non-zero sample results from each flux reversal. Since an ideal partial response system is equivalent to a discrete-time filter, the analysis techniques used on filters can be applied. The D-transform is commonly used in magnetic disk storage. Here, the transform variable D represents unit time delay, the same delay as the inverse of the z-transform, i.e. $D=z^{-1}$. The D-transform of the unit pulse response of a digital filter is the transfer function of that filter, and can be used to reveal its characteristics in the frequency domain. For a finite impulse response filter, the D-transform is simply the polynomial in D whose coefficients are the same as the unit pulse response sequence. So, for example, the EPR4 unit pulse (or dibit) response sequence of $(1,1,-1,-1)$ is described by the polynomial $1+D-D^2-D^3$. This is referred to as the EPR4 partial-response polynomial. Partial response systems described by the polynomials $1+D$, $1-D$ and $1-D^2$ are known as duobinary, dicode and Class IV (or "PR4"), respectively.

The detector attempts to match read signal samples to possible PR channel output sequences. FIGS. 3 and 4 show typical PR channel pulse responses (i.e. response to magnetic transitions in adjacent bit cells.) For EPR4, an 8-state Viterbi detector generally realizes this detector, and essentially works by using an iterative method to determining the most likely route along the branches of a trellis, "most likely" generally meaning the path creating the minimum square error. PRML detection allows RLL (0,4/4) encoding, which improves the ratio of user data to stored data to about 8:9 (an example of a commercial implementation of this encoding is Quantum's Empire series) or better. This increased ratio allows more efficient use of platter area as well as increased data transfer rates. A new rate 24/25 encoding is disclosed in commonly-assigned U.S. patent application Ser. No. 08/774,412 filed Dec. 31, 1996, now U.S. Pat. No. 5,757,294.

In its current implementation, PRML presents limitations. It is generally known that for any given magnetic recording product, variations exist in the actual head/media response on a per head/disk basis as a function of many parameters, including manufacturing tolerances on the head and disk components, fly height of the magnetic head, component aging, environmental conditions, radius of the particular track, etc. This variation manifests itself mainly in pulse width and signal-to-noise-ratio variations. These variations mean that not only is an adaptive or programmable filter necessary, but also the optimum partial response target varies over the range of heads and disks, aging, etc. The optimal partial response target would be one that adapts as a function of channel variation to jointly maximize the minimum-distance (known as "Dina") between all allowable sequences of idealized channel outputs (ICO's), while also minimizing the noise and equalization error for Dina-type Viterbi detector error events (known as "sigma"), i.e., maximize "Dina/sigma". Unfortunately, there are no known algorithms today for automatically doing this optimization over all possible types of Viterbi detector error events.

System designers are currently forced to choose between canonical $(1-D)(1+D)^N$ fixed partial response type targets and minimum mean square error (MMSE) type targets. Canonical targets, even the modern $E^2PR4$, are an approximate match to the magnetic channel and are relatively simple to implement, but suffer from the existence of "quasi-catastrophic" error sequences due to spectral nulls at the Nyquist frequency, as well as significant equalization losses over relevant channel densities. MMSE targets are a good match to the channel, but only minimize "sigma" (noise and equalization error). They do not necessarily maximize the minimum-distance ("dmin"). In addition, they must be implemented as an adaptive or programmable-target Viterbi detector, which is large and complex because of its generality. Moreover, timing and gain acquisition for MMSE targets can be complicated by the variable nature of target response. Finally, while filter adaptation in the read channel has been shown to be quite useful, the joint adaptation of filter and target can be unstable in adaptive target systems without special precautions. In summary, currently canonical PRML is preferred over pulse-peak detection but the need for improvements in PRML systems remain.

SUMMARY OF THE INVENTION

In view of the foregoing background summary, a general object of the present invention is to find a class of fixed partial response targets that have near-optimum Viterbi detector bit-error-rates (i.e., maximize dmin/sigma) for a magnetic channel over a range of typical head/disk variation, with the "ease-of-use" advantages of canonical fixed partial response targets—e.g. ease of timing/gain acquisition, and easier channel optimization with fewer variable parameters—in the read channel architecture of magnetic storage devices.

Another object of the invention is to create a read channel partial response target that is DC free, that is, has a spectral null at DC.

A further object is to implement a target that has a spectral depression at the Nyquist frequency, rather than a spectral null.

Yet another object is to have no additional nulls in the channel response (other than that at DC).

A still further object is to create a target whose response to a 2T preamble pattern is the peaks and zero-crossings sequence to facilitate timing and gain acquisition in a disk drive.

A still further object is to provide a target that is well scaled to the least significant bits of a data path's analog to digital converter.

Another object is to improve disk drive performance, by reducing bit error rates while improving recording density, by means of a fixed-target PR polynomial that minimizes equalization losses in a magnetic recording system.

One aspect of the present invention defines a new class of partial response targets that gain the benefits of both minimum mean square error type targets and canonical type targets. The new partial response targets are extremely effective for magnetic storage devices such as hard drives and tape drives. The presently preferred embodiment of the invention includes a 16-state Viterbi detector and implements a partial response target described by the polynomial $7+4*D-4*D^2-5*D^3-2*D^4$, where D is the delay operator. The new class of targets exhibit a null at DC, and a non-zero but attenuated response at the Nyquist frequency. The preferred partial response target is most effective in channels where the relative recording density $pw_{50}/T$ ratio ranges from approximately 2 to 3 where the relative recording density $pw_{50}/T$ is defined as a pulse width measured at 50% amplitude of the natural response of the disk drive head-disk assembly, divided by the recording cell time or bit period. The bit period T corresponds to the bit density on the magnetic medium, and can be thought of as the minimum time between flux transitions on the medium. As bit density increases, T decreases, and the ratio of $pw_{50}/T$ increases.

Other aspects of the invention include several other response targets that generate excellent performance in the magnetic channel, and satisfy most of the criteria of the preferred embodiment. Specifically, the preferred target $7+4*D-4*D^2-5*D^3-2*D^4$ provides a response that is (1) DC free; (2) suppressed at Nyquist frequency; and (3) provides zero-crossings responsive to a 2T write current pattern. Other targets that are DC free and provide 2T sequence zero crossings are described by the polynomials:

$6+5*D-5*D^2-4*D^3-2*D^4$ and
$5+5*D-5*D^2-4*D^3-1*D^4$

We have found additional targets that have the necessary DC and Nyquist properties, but lack the 2T zero-crossings. These additional targets are described by the polynomials:

$7+3*D-5*D^2-4*D^3-1*D^4$
$9+3*D-6*D^2-5*D^3-1*D^4$

All of these targets are within the scope of the present invention.

Another aspect of the invention is a disk drive that includes: an analog signal path coupled to the data transducer head and forming a read signal responsive to flux transitions during a read operation of the disk drive; means for quantizing samples of the read signal to form a series of samples; a FIR filter for filtering the series of samples; the FIR filter means including filter characteristics selected in response to the current radial zone location of the data transducer head over the data storage surface, and further including filter characteristics implementing a fourth-order partial response target; and a 16-state Viterbi detector means for maximum likelihood decoding of the filtered series of samples so as to form a series of detected bits. In the description below, we sometimes refer to the new class of partial response targets as "NPR".

A still further aspect of the invention is a disk drive system that implements a new partial response target whose response to a 2T preamble pattern is a peaks and zero-crossings sequence to facilitate timing recovery and automatic gain control.

These and other features, aspects and advantages of the invention will become better understood in view of a detailed description of several preferred embodiments, beginning with an overview of the drawings.

DETAILED DESCRIPTION OF PRESENTLY PREFERRED EMBODIMENTS OF THE INVENTION

A PRML Disk Drive System

Figure 1:
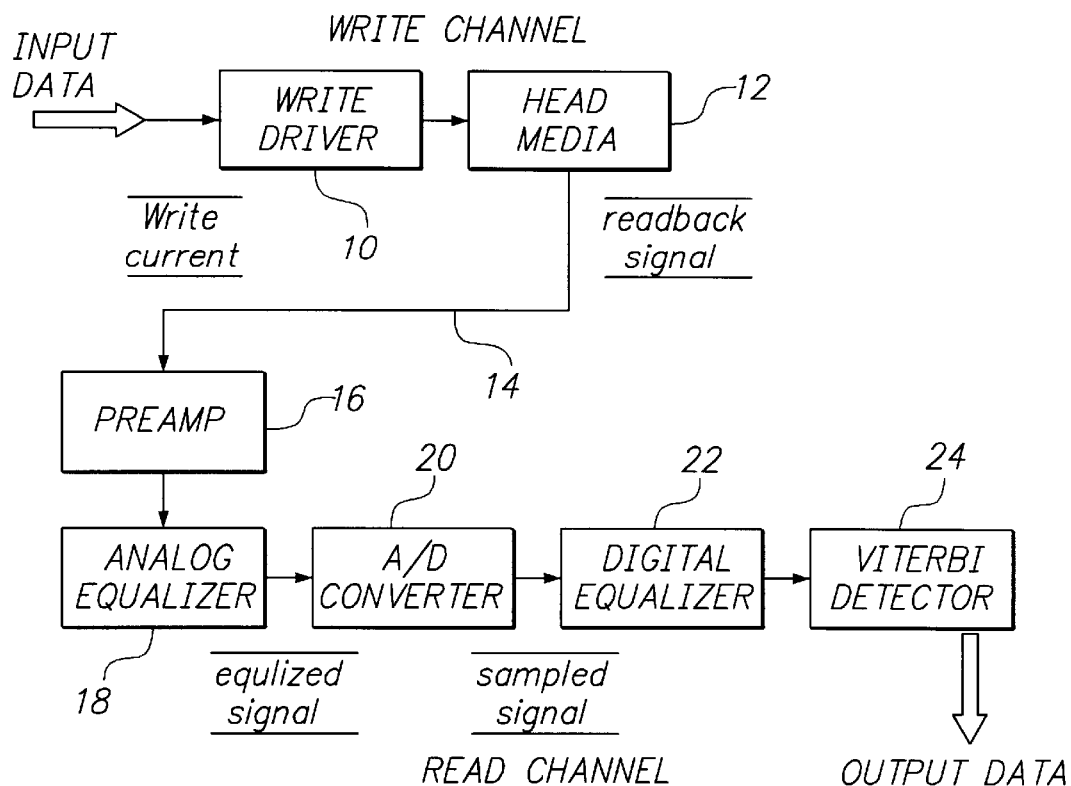
FIG. 1 is a photographic image of the positioning of read channel electronics on a hard drive.

FIG. 1 is a simplified block diagram illustrating the principal building blocks of a magnetic recording and read channel of the type commonly used in a disk drive. In the write channel, user data is encoded using a run length limited (RLL) code, such as RLL (1,7) or RLL (0,4/4), the latter providing a ratio of user data to stored data of about 8/9. The encoded series of bits are input to write driver circuitry 10 which controls current applied to a write head carried on a slider over the rotating magnetic disk medium 12. The write driver in combination with the write head records the data as a series of magnetic flux transitions on a selected track on the medium. For example, a "1" is represented as a transition and a "0" no transition.

During playback, the read head provides an analog signal responsive to the flux transitions as the data track moves past the head. The analog read signal 14 is input to a preamp 16 and then to analog equalizer circuitry 18. Circuitry 18 provides a preliminary analog equalization of the read signal. The equalized read signal is then sampled and the samples are converted to digital values in a high-speed A/D converter 20. In general, the read channel amplifies and filters the read signal to remove noise and to shape the waveform—a process known as equalization. First, the read signal is normalized with respect to gain and offset so that it falls into an expected signal range centered at zero. With gain and offset normalization, the required dynamic range of subsequent circuits can be limited, which reduces power consumption and increases possible clock frequencies and data rates. Next, unwanted high-frequency noise is removed with a continuous time low-pass filter. This step permits sampling of the signal without aliening of high-frequency noise back into the signal spectrum.

In one prior art implementation, the analog equalizer block 18 comprises a variable gain amplifier, low-pass filter, and an adaptive equalizer implemented as a FIR filter. The goal is to have the output of the FIR filter match the target response, for example a three-level PR4 signal. The adaptive equalization can be implemented in various ways which are known to those skilled in the art. For example, the article by K. D. Fisher et al., entitled *PRML Detection Boosts Hard-Disk Drive Capacity* (IEEE Spectrum, November, 1996) describes an adaptive equalizer implemented as a 10-tap FIR filter using a mixed signal approach. In that FIR filter, the signal values at the output of each tap are multiplied by a calculated value (a tap weight) and summed to generate the FIR output in analog circuitry. However, tap weight control processing is implemented with digital circuitry. A DSP computation unit updates the FIR filter's tap weights using the standard least means square algorithm ("LMS"). LMS operates in the time domain to define tap weight coefficients that minimize the means-squared error between the sample values and the desired response. Returning to FIG. 1, the equalized signal is converted to digital samples, as noted, and further equalized in a digital equalizer 22 and finally applied to the Veterbi detector 24.

Figure 2:
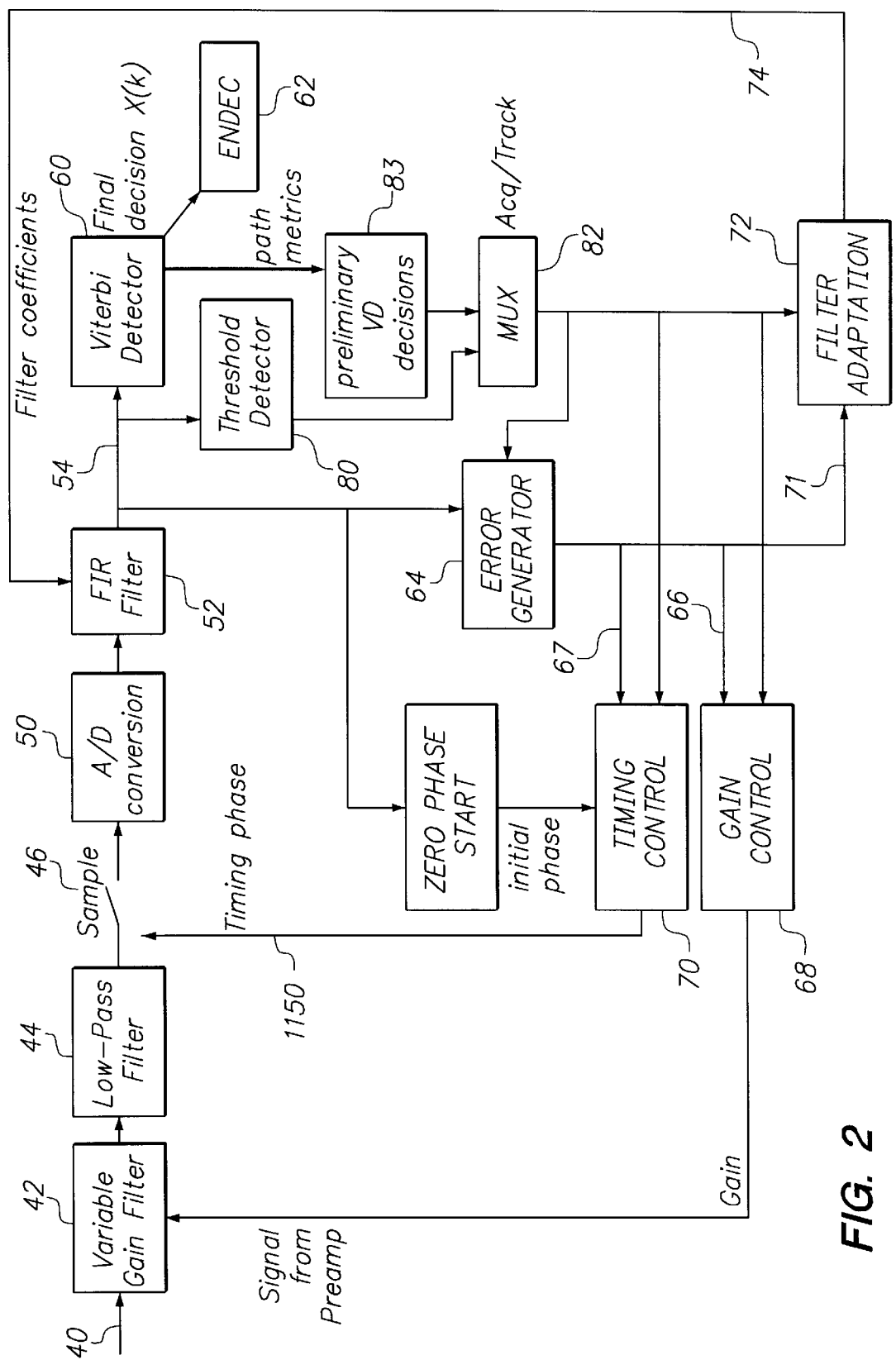
FIG. 2 is a block-level schematic diagram of a known disk drive that employs a PRML read channel circuit with digital adaptive equalization.

FIG. 2 illustrates an alternative arrangement of a magnetic read channel showing more detail of the adaptation features.

In FIG. 2, a read signal is input at 40 from the preamp to a variable gain filter 42. This filter forms part of the equalization process and supports normalization of the signal with respect to gain and offset. The read signal is then input to a low-pass filter 44 to reject high-frequency noise as noted above. The filtered analog signal is sampled by a sampler 46 and the sample is converted to digital values in A/D conversion circuitry 50. This stream of digital values is then filtered in a digital FIR filter 52, as contrasted with the implementation of FIG. 1 in which adaptive FIR filtering is implemented in the analog domain prior to sampling; it can be designed either way.

The properly equalized sample values are input at 54, for example in the form of 6-bit digital values, to a Veterbi detector 60. The detected bits are input to ENDEC 62 to reconstruct the original user data from the modulation encoded form. The read data bits may then be subjected to error correction, buffering, etc. (not shown), and finally output for example to a computer data bus.

To properly equalize and detect the user-data bits, several parameters must be adaptively controlled. In FIG. 2, the sample values at node 54 are applied to an error generator circuit 64 where they are compared to the ideal target response values. As described above, in one preferred embodiment of the present invention, these values are in accordance with a $7+4D-4D^2-5D^3-2D^4$ polynomial. These values are relative and they may be scaled to the A/D output bits as appropriate. The error generator 64 provides an error signal via 66 to gain control circuitry 68 which in turn controls the variable gain filter 42 as noted previously. The error generation preferably is implemented digitally. The error generator 64 also provides input via path 67 to timing control circuitry 70 which in turn adjusts the sampling phase of the sampler 46. Finally, the error generator 64 provides input via path 71 to filter adaptation circuitry 72 which in turn controls the filter values via feedback loop 74 to the FIR filter 52. Again, these adaptive control signals are generated by comparing the equalizer output samples at node 54 with the expected target response levels. Additional details for implementing an adaptive PRML read channel are described in U.S. Pat. No. 5,341,249 entitled Disk Drive Using PMRL Class IV Sampling Data Detection with Digital Adaptive Equalization.

A threshold detector 80, multiplexer 82 and related circuitry 83 are used for timing acquisition prior to reading data. To summarize, the present invention can be implemented in a conventional PRML read channel architecture. The equalization circuitry need only be adapted to the new target response, and an appropriate 16-state Veterbi detector provided, again using known technologies.

To appreciate the benefits of this invention, it is helpful to understand how Viterbi detection works. One good example of a Viterbi detection scheme is given in commonly assigned U.S. Pat. No. 5,341,387 entitled VITERBI DETECTOR HAVING ADJUSTABLE DETECTION THRESHOLDS FOR PRML CLASS IV SAMPLING DATA DETECTION, incorporated herein by this reference, although the present invention does not necessarily require adjustable detection thresholds. As mentioned in the background section, the algorithm essentially provides an iterative method of determining the maximally likelihood route along the branches of a trellis. As shown in FIG. 2, the Viterbi detector 60 receives a series of samples, expressed as digital values (e.g. 6 bits) from the Finite Impulse Response (FIR) block 52. The detector's task is to take the stream of quantized, sampled values from the FIR filter and in effect "decide" which sequence of values is the most likely to have been received.

The power of Viterbi detection—and PRML in general—is that it works with sequences of received data rather than single bits (as in pulse peak), comparing these sequences of "data" (not user data but filtered read signal samples) with the few known possible sequences to determine which sequence is most likely to have been the actual data. A simple analogy is that of handwriting recognition. Systems that attempt to recognize individual characters often fail, as every individual's writing style is highly variable. Systems that recognize entire words, however, have a much higher success rate: when analyzing the word stapler, for example, even if the program can't decode the letter s, checking the rest of the word tapler against an internal dictionary shows that the unrecognizable character must be an "s".

The New Class of Fixed Partial Response Targets

The read channel output can be described as a finite state machine that looks at a window of magnetization values and then generates a sample value. To see how this works for the preferred embodiment of the invention, examine Table 1 below. In the Table, the current state reflects the previous four known magnetizations, represented by "−"=binary 0 and "+"=binary 1. The most recently received state is on the right (1sb) and the oldest on the left (msb). The resulting four-bit binary sequence is expressed as a decimal number according to a shorthand notation commonly used in the art. Thus the magnetization sequence "− − − −" is represented by 0, −+−− is represented by 4,+−−+ by 9, etc. This shorthand notation is used in Table 2 described below.

At the next cell time period T, a new value is read, magnetic+or −. The oldest of the four previous magnetization states is moot, and the newest value can be either a +or − Table 1 below illustrates the state transition from 3 to 6 or 7 (depending on the next value). The first four time periods are '−−++,' for a value of 3. The next time period, the four values are shifted left (throwing away the most significant value of the previous period), and the new value is read, either a − or +. If −, the new state value is 6; if +, it's 7.

TABLE 1

State Transition Example

| | T = 1 | T = 2 | T = 3 | T = 4 | State Value |
|---|---|---|---|---|---|
| T | − | − | + | + | 3 |
| T + 1 | − | + | + | −/+ | 6/7 |

Each state transition, i.e. each new read signal sample, results in an output—the Ideal Channel Output ("ICO") —described by the target polynomial $7+4*D-4*D^2-5*D^3-2*D^4$ (or any of the other members of the class listed above). As mentioned in the Background, the idealized partial-response system is equivalent to a digital filter. Thus the channel response according to the preferred embodiment is equivalent to a digital filter with coefficients [7 4−4−5−2]. Accordingly, the ICO can be derived by convolving the polynomial with the magnetization pattern written on the disk. A span of 5 consecutive magnetic domains (+ or −) uniquely determine the idealized channel output.

Table 1 above merely illustrates one example of this process. All 16 possible states and 32 transitions of the "state machine" are shown below in Table 2:

TABLE 2

State Machine for 16-State Viterbi Detector.

| Current State | Next State | Ideal Channel Output |
|---|---|---|
| 0 | 0 | 0 |
| 0 | 1 | 14 |
| 1 | 2 | 8 |
| 1 | 3 | 22 |
| 2 | 4 | −8 |
| 2 | 5 | 6 |
| 3 | 6 | 0 |
| 3 | 7 | 14 |
| 4 | 8 | −10 |
| 4 | 9 | 4 |
| 5 | 10 | −2 |
| 5 | 11 | 12 |
| 6 | 12 | −18 |
| 6 | 13 | −4 |
| 7 | 14 | −10 |
| 7 | 15 | 4 |
| 8 | 0 | −4 |
| 8 | 1 | 10 |
| 9 | 2 | 4 |
| 9 | 3 | 18 |
| 10 | 4 | −12 |
| 10 | 5 | 2 |
| 11 | 6 | −4 |
| 11 | 7 | 10 |
| 12 | 8 | −14 |
| 12 | 9 | 0 |
| 13 | 10 | −6 |
| 13 | 11 | 8 |
| 14 | 12 | −22 |
| 14 | 13 | −8 |
| 15 | 14 | −14 |
| 15 | 15 | 0 |

The Table above shows all possible state transitions, given that only the most recent "bit" or flux state changes at any one time. So, for example, the state 10 indicating (+−+−) can only change to state 4 (−+−−) or to state 5 (−+−+) given that the most recent states (−+−) shift left and one new bit is received.

Features of the New Class of Targets

Figure 3:
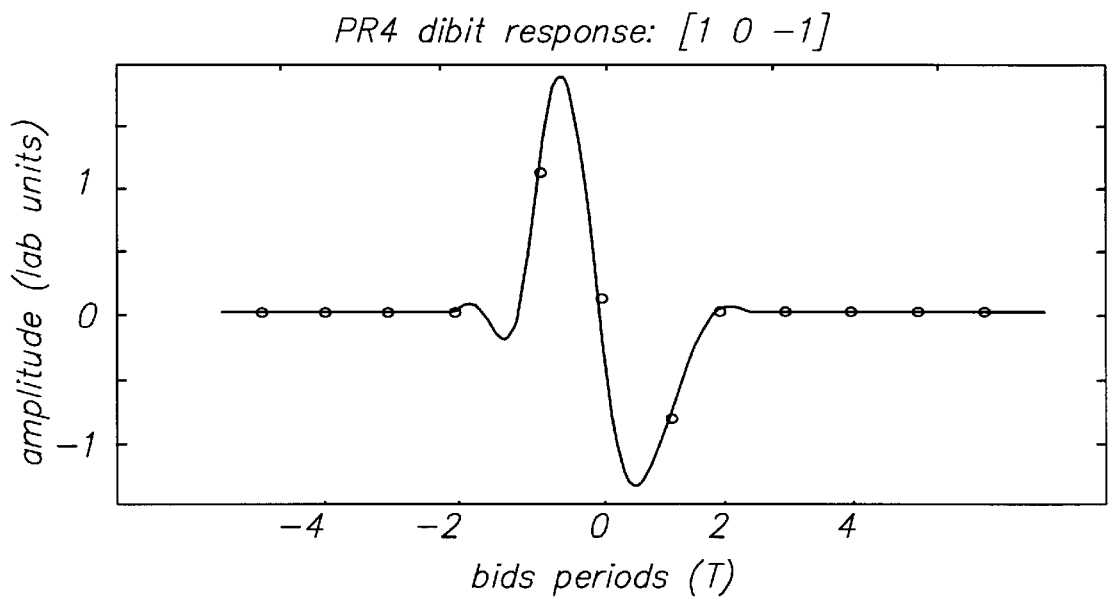
FIG. 3 is a plot illustrating the ideal channel output for a PR4 (partial response class IV) dibit response.
Figure 4:
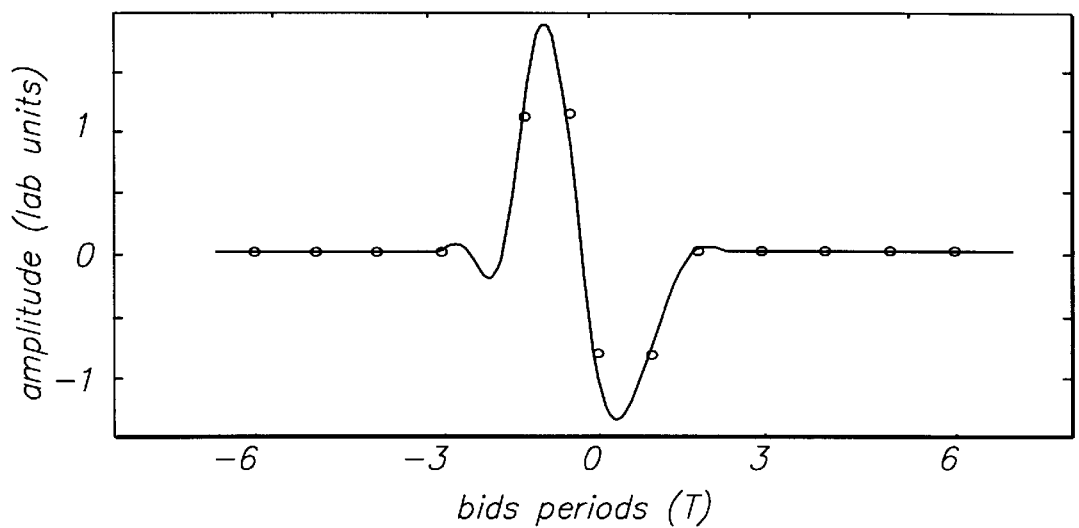
FIG. 4 is a plot illustrating the ideal channel output for EPR4 (extended partial response class IV) dibit response.
Figure 5:
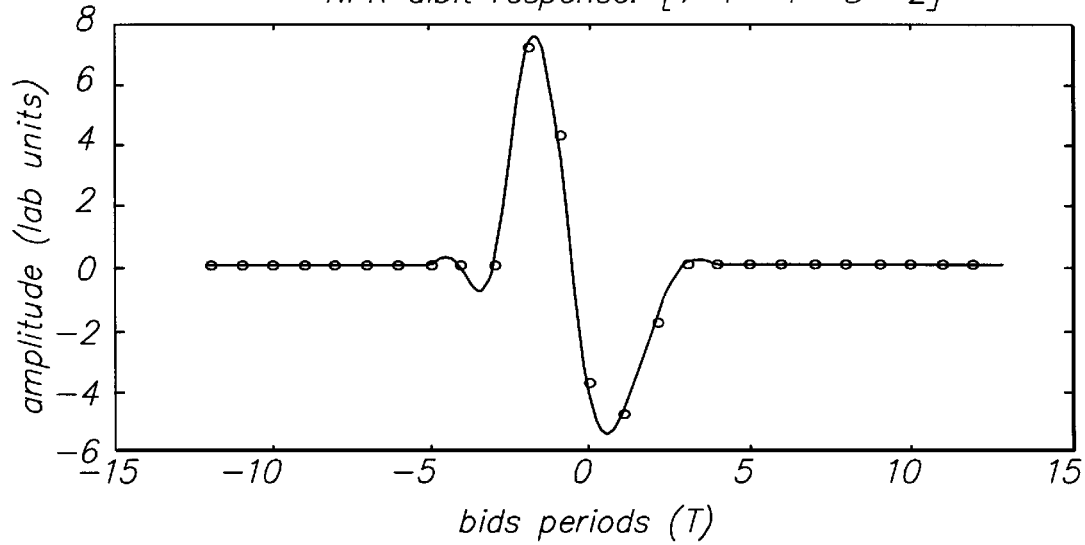
FIG. 5 is a plot illustrating the dibit response of one preferred embodiment of the present invention.

1. Nyquist Frequency Response. Known magnetic channels typically have canonical $(1-D)(1+D)^N$ type fixed partial response targets for two reasons: they match the magnetic channel reasonably well and are simple to implement. The two most common are PR4, $1+0*D-1*D^2$ (where D is the delay operator), and EPR4, $1+1*D-1*D^2-1*D^3$. See FIG. 3 and FIG. 4, respectively, for illustrations of these channel target responses. These targets are attractive due to simple +/−1 coefficients and their adherence to the crude $(1-D)(1+D)^N$ model of the recording channel. The PR4 and EPR4 responses are also well suited for easy timing and gain acquisition as they have simple 2 and 3-level responses to a 2T acquisition sequence. However, the canonical class exhibits a spectral null at the Nyquist frequency. This can be shown by filtering the Nyquist input sequence (a sinewave comprising alternating magnetizations on the storage medium, −+−+−etc., which we will represent as −1+1−1+1−1) with the target response:

PR4: $(1*-1)+(0*+1)+(-1*-1)=-1+0+1=0$

EPR4: $(1*-1)+(1*+1)+(-1*-1)+(-1*+1)=-1+1+1-1=0$

This is a problem because spectral nulls at the Nyquist frequency lead to quasi-catastrophic error sequences. it also tends to cause equalization losses at higher channel densities $pw_{50}/T$ greater than approximately 2.2. The prior art targets also tend to cause equalization losses as the real magnetic channel does not itself have a spectral null.

Next we compare these responses to the Nyquist pattern response when filtered with the present invention (NPR) non-canonical target values:

NPR: $(-1*+7)+(+1*+4)+(-1*-4)+(+1*-5)+(-1*-2)$
$=-7+4+4-5+2=-2$

Thus the present invention provides a read channel response that exhibits a spectral depression at the Nyquist frequency but not a spectral null. In other words, the new target response is non-zero but attenuated at the Nyquist frequency. The advantages of this include an excellent match to the magnetic channel at higher densities of interest, $pw_{50}/T=2.0$–3.0; less equalization losses; and complete removal of quasi-catastrophic error sequences, except for DC sequences. These are not a concern, however, as DC sequence-caused error sequences are easily eliminated by coding. One important benefit gained by not having to code away any error sequences (except DC-caused ones) is that much higher ratio RLL codes can be used, with rates approaching unity.

In the presently preferred embodiment of a disk drive that utilizes the invention, for example, we employ a rate 24/25 modulation code. The rate 24/25 code word uses rate 8/9 RLL encoding of one byte of user data, combined with interleaved unencoded bytes to achieve improved code rates with reasonably good global run length constraint. Methods and apparatus for implementing the rate 24/25 code are described in detail in U.S. patent application Ser. No. 08/774,412 filed Dec. 31, 1996 assigned to Quantum Corporation entitled A RATE 24/25 MODUTLATION CODE FOR PRML RECORDING CHANNELS, now U.S. Pat. No. 5,757,294, the disclosure of which is incorporated herein by reference.

2. DC Free Characteristic.

Another advantage of the present invention is that the target is DC free, meaning it has a spectral null with a constant input sequence. Data is usually stored on the magnetic medium with a transition indicating a '1' and no transition indicating a '0.' Thus a series of '0's would result in a constant magnetic field on the area of the data, either +++++ or -------. To verify that there is a spectral null at DC, simply plug in the preferred target response:

$(1*7)+(1*4)+(1*-4)+(1*-5)+(1*-2)=7+4-4-5-2=0$

There are several advantages to having a DC-free target. First, having a DC free target does not cause any problems for DC offset cancellation circuits. Furthermore, sequence detection is insensitive to the DC offsets. This property also makes the read channel mechanism less sensitive to thermal asperities in the drive. DC free targets also are extremely good matches to the channel at low frequencies. Moreover, since there are no additional spectral nulls in the channel response, there is no requirement for any special coding to avoid long error sequences.

3. Response to 2T Preamble Pattern.

The preferred target is quite well matched to the peaks and zero crossings of a 2T preamble pattern, which leads to easier timing and gain acquisition when the drive is starting up. To illustrate, the response to a 2T pattern response can be determined from the ICO Table 2 above, as shown in the following Table 3:

TABLE 3

| 2T PREAMBLE RESPONSE. | | |
|---|---|---|
| 2T PATTERN | NEXT STATE | OUTPUT |
| --++- | 6 | 0 |
| -++-- | 12 | -18 |

TABLE 3-continued

| 2T PREAMBLE RESPONSE. | | |
|---|---|---|
| 2T PATTERN | NEXT STATE | OUTPUT |
| ++--+ | 9 | 0 |
| +--++ | 3 | 18 |

Thus the preferred target provides digital data values at peaks and zero-crossings for ease of implementation of a read channel using a 2T preamble sequence. Finally, the target is scaled to the least significant bits (LSB's) of the data path's 6-bit A/D converter. All of these characteristics illustrate just how effective a response target the present embodiment is for magnetic is channels.

5. Summary of New Class of Targets.

In general, for a target described by a polynomial of the form an $+bnD+cnD^2+dnD^3+enD^4$, where a,b,c,d and e are integer coefficients, the DC free property is satisfied if the coefficients sum to zero. A spectral depression at Nyquist results where the response to the Nyquist input sequence is relatively small but non-zero, e.g. a magnitude less than about 2. In addition, to provide the 2T sequence zero crossings, a sufficient but not necessary condition is that the coefficients of the target have the relationship a−b−c+d+e=0. Our preferred target [7 4-4-5-2] has all three of these desired properties. Combining both the DC free and 2T response criteria, we find that the target polynomial coefficients must satisfy the relations: a+d+e=0 and b=−c. These criteria are satisfied by the targets:

$7+4*D-4*D^2-5*D^3-2*D^4$ $6+5*D-5*D^2-4*D^3-2*D^4$ and $7+5*D-5*D^2-5*D^3-2*D^4$ (null rather than depression at Nyquist sampling frequency)

However, if the 2T preamble response criterion is relaxed, the DC null and Nyquist depression null requirements are also met by the following targets:

$7+3*D-5*D^2-4*D^3-1*D^4$ $9+3*D-6*D^2-5*D^3-1*D^4$

In actual testing, read channel VLSI implementations of this target response produced excellent results, with bit error rates decreasing by two or three orders of magnitude. This was tested by swapping standard EPR4 drive circuitry with the present embodiment circuit—using the same hard drive platter. The bit error rate improved by some one to three orders of magnitude.

It should be understood that the invention is not limited to the illustrated embodiment, and that many changes and modifications can be made within the scope of the invention by a person skilled in the art.

What is claimed is:

1. A magnetic recording and playback system including a moving magnetic data storage medium defining a data storage surface, a data transducer head positionable by head positioning means relative to a track formed on the data storage surface for storing user data in the form of magnetic flux transitions, the system further including a partial response, maximum likelihood data channel comprising:

an analog signal path coupled to the data transducer head and forming a read signal responsive to flux transitions during a read operation of the disk drive;

quantization means for quantizing samples of the read signal to form a series of samples;

an FIR filter for filtering the series of samples so as to implement a non-canonical fixed partial response target which has a spectral null at DC and a spectral depression at the Nyquist sampling frequency; and a Viterbi detector having at least sixteen states and being arranged for maximum likelihood decoding of the filtered series of samples so as to form a series of detected bits.

2. A system according to claim 1 wherein the quantization means includes an analog to digital conversion means for converting the series of samples into a corresponding series of digital sample values; and wherein the FIR filter means comprises an adaptive digital FIR filter for filtering the series of digital sample values, and the Viterbi detector is arranged to decode the filtered series of digital sample values.

3. A system according to claim 1 wherein the FIR filter implements a fourth-order non-canonical fixed partial response target.

4. A system according to claim 3 wherein the filter implements a fourth-order non-canonical fixed partial response target substantially equal to $7n+4nD-4nD^2-5nD^3-2nD^4$, where n is a non-zero integer and D is the unit delay operator.

5. A system according to claim 3 wherein the filter implements a fourth-order non-canonical fixed partial response target substantially equal to $6n+5nD-5nD^2-4nD^3-2nD^4$ where n is a non-zero integer and D is the unit delay operator.

6. A system according to claim 3 wherein the filter implements a fourth-order non-canonical fixed partial response target substantially equal to $5n+5nD-5nD^2-4nD^3-1nD^4$ where n is a non-zero integer and D is the unit delay operator.

7. A system according to claim 3 wherein the filter implements a fourth-order non-canonical fixed partial response target substantially equal to $9n+3nD-6nD^2-5nD^3-1nD^4$ where n is a non-zero integer and D is the unit delay operator.

8. A system according to claim 3 wherein the filter implements a fourth-order non-canonical fixed partial response target substantially equal to $7n+3nD-5nD^2-4nD^3-1nD^4$ where n is a non-zero integer and D is the unit delay operator.

9. A system according to claim 1 where the non-canonical fixed partial response target has samples taken at peaks and zero crossings during playback of a 2T write current pattern.

10. A system according to claim 1 where the FIR filter implements a fourth-order non-canonical fixed partial response target that has samples taken at peaks and zero crossings during playback of a 2T write current pattern.

11. A magnetic read channel apparatus comprising:

a low-pass filter for filtering an analog read signal;

a sampling means for forming a series of digital sample values responsive to the filtered analog read signal;

an FIR filter for filtering the series of digital sample values; and a Viterbi detector for determining a series of output bits responsive to the filtered series of digital sample values;

wherein the low-pass filter, the sampling means and the FIR filter together form an equalization circuit, and the equalization circuit has a non-canonical fixed partial response target which manifests a spectral null at DC and a spectral depression at the Nyquist sampling frequency.

12. A magnetic read channel apparatus according to claim 11 wherein the non-canonical fixed partial response target is a fourth order target described by a polynomial having a form of $an+bnD+cnD^2+dnD^3+enD^4$, where a, b, c, d and e are integer coefficients, and n is a non-zero integer scale factor, and the sum $a+b+c+d+e=0$ and wherein $b=-c$ and $a+d+e=0$.

13. A magnetic read channel apparatus according to claim 12 wherein $a-b-c+d+e=0$.

14. A system according to claim 11 where the FIR filter implements a fourth-order non-canonical fixed partial response target that has samples taken at peaks and zero crossings during playback of a 2T write current pattern.

15. A magnetic read channel apparatus according to claim 14 wherein the Nyquist response is $a-b+c-d+e=2w$ and $b=-c$, $d=-b-w$, and $e=-a+b+w$.

16. A method of equalizing a read signal in a partial response, maximum likelihood sampled data detection system of a magnetic recording and playback system that includes a moving data magnetic recording medium for storing and reading back data in the form of magnetic flux transitions on the medium via a data transducer assembly, the method comprising the steps of:

selecting a relative data density in a range of approximately 2.0 to 3.0 where the relative data density is defined as a pulse width measured at 50% amplitude of the natural response of the data transducer assembly, divided by a recording cell time;

recording user data on the magnetic recording medium at approximately the selected relative data density;

during a read operation, forming a read signal responsive to flux transitions on the magnetic recording medium;

sampling the read signal at substantially a selected sample rate to form a series of sampled data;

digitally filtering the sampled data, said filtering step including providing a fourth-order digital FIR filter configured to implement a non-canonical, at least fourth-order fixed partial response target response described by a polynomial of the form $an+bnD+cnD^2+dnD^3+enD^4$, where a,b,c,d and e are integer coefficients, n is a non-zero integer scale factor and D is the unit delay operator, and wherein the target manifests a spectral null at DC; and selecting the integer coefficients so that the target response exhibits a non-zero but attenuated response at the Nyquist frequency determined by the recording cell time.

17. A method according to claim 16 wherein the integer coefficients are $a=7$, $b=4$, $c=-4$, $d=-5$, and $e=-2$.

18. A method according to claim 16 wherein the sampling step includes providing an A/D converter for converting the read signal to a series of digital samples and further comprising selecting the integer scale factor n in accordance with digital levels output by the A/D converter.

19. A method according to claim 16 wherein the scale factor $n=1$.

20. A method according to claim 16 wherein the said filtering step includes dynamically adapting the digital FIR filter to achieve the target polynomial response.

21. A method according to claim 16 wherein the coefficients a,b,c,d and e have the values listed in one row of the following table, respectively:

| "a" | "b" | "c" | "d" | "e" |
|---|---|---|---|---|
| 7 | 4 | −4 | −5 | −2 |
| 6 | 5 | −5 | −4 | −2 |
| 7 | 3 | −5 | −4 | −1 |
| 9 | 3 | −6 | −5 | −1. |

22. A method according to claim 21 wherein the scale factor n=1.

23. A method according to claim 16 wherein the integer coefficients are selected so as to provide a zero-crossing response to a 2T preamble sequence.

24. A magnetic read channel apparatus comprising:
a low-pass filter for filtering an analog read signal;
a sampling means for forming a series of digital sample values responsive to the filtered analog read signal;
an FIR filter for filtering the series of digital sample values; and
a Viterbi detector for determining a series of output bits responsive to the filtered series of digital sample values;
wherein the low-pass filter, the sampling means and the FIR filter together form an equalization circuit, and the equalization circuit has a non-canonical fixed partial response target substantially in accordance with $7n+4nD-4nD^2-5nD^{3-2}nD^4$ where n is a non-zero integer and D is the unit delay operator.

25. A magnetic read channel apparatus comprising:
a low-pass filter for filtering an analog read signal;
a sampling means for forming a series of digital sample values responsive to the filtered analog read signal;
an FIR filter for filtering the series of digital sample values; and
a Viterbi detector for determining a series of output bits responsive to the filtered series of digital sample values;
wherein the low-pass filter, the sampling means and the FIR filter together form an equalization circuit, and the equalization circuit has a non-canonical fixed partial response target substantially in accordance with $6n+5nD-5nD2-4nD^3-2nD^4$ where n is a non-zero integer and D is the unit delay operator.

26. A magnetic read channel apparatus comprising:
a low-pass filter for filtering an analog read signal;
a sampling means for forming a series of digital sample values responsive to the filtered analog read signal;
an FIR filter for filtering the series of digital sample values; and
a Viterbi detector for determining a series of output bits responsive to the filtered series of digital sample values;
wherein the low-pass filter, the sampling means and the FIR filter together form an equalization circuit, and the equalization circuit has a fixed partial response target substantially in accordance with $5n+5nD-5nD^2-4nD^3-1nD^4$ where n is a non-zero integer and D is the unit delay operator.

27. A magnetic read channel apparatus comprising:
a low-pass filter for filtering an analog read signal;
a sampling means for forming a series of digital sample values responsive to the filtered analog read signal;
an FIR filter for filtering the series of digital sample values; and
a Viterbi detector for determining a series of output bits responsive to the filtered series of digital sample values;
wherein the low-pass filter, the sampling means and the FIR filter together form an equalization circuit, and the equalization circuit has a non-canonical fixed partial response target substantially in accordance with $7n+3nD-5nD^2-4nD^3-1nD^4$ where n is a non-zero integer and D is the unit delay operator.

28. A magnetic read channel apparatus comprising:
a low-pass filter for filtering an analog read signal;
a sampling means for forming a series of digital sample values responsive to the filtered analog read signal;
an FIR filter for filtering the series of digital sample values; and
a Viterbi detector for determining a series of output bits responsive to the filtered series of digital sample values;
wherein the low-pass filter, the sampling means and the FIR filter together form an equalization circuit, and the equalization circuit has a non-canonical fixed partial response target substantially in accordance with $9n+3nD-6nD^2-5nD^3-1nD^4$ where n is a non-zero integer and D is the unit delay operator.

\* \* \* \* \*

UNITED STATES PATENT AND TRADEMARK OFFICE
CERTIFICATE OF CORRECTION

PATENT NO. : 6,249,398 B1  
DATED : June 19, 2001  
INVENTOR(S) : Fisher et al.

Page 1 of 1

It is certified that error appears in the above-identified patent and that said Letters Patent is hereby corrected as shown below:

Column 13, claim 24,  
Line 28, replace "$7n+4nD-4nD^2-5nD^{3-2}nD^4$" with -- $7n+4nD-4nD^2-5nD^3-2nD^4$ --.

Column 13, claim 25,  
Line 43, replace "$6n+5nD-5nD2-4nD^3-2nD^{4"}$" with -- $6n+5nD-5nD^2-4nD^3-2nD^4$ --.

Signed and Sealed this

Fifth Day of March, 2002

Attest:

JAMES E. ROGAN  
Attesting Officer   Director of the United States Patent and Trademark Office